UNITED STATES PATENT OFFICE.

LOUIS G. MEYER, OF CLEVELAND, OHIO, ADMINISTRATOR OF HUGO HENSCH, DECEASED.

IMPROVEMENT IN FOOD FOR INFANTS.

Specification forming part of Letters Patent No. 154,147, dated August 18, 1874; application filed August 3, 1874.

*To all whom it may concern:*

Be it known that I, LOUIS G. MEYER, of Cleveland, in the county of Cuyahoga and State of Ohio, duly-appointed administrator of the estate of HUGO HENSCH, deceased, (as, by reference to the duly-certified copy of letters of administration hereunto annexed, will more fully appear,) do verily believe that the said HUGO HENSCH has or did invent a certain new and Improved Compound of Nourishing Meal, of which the following is a specification:

The nature of this invention relates to a meal for the nourishment of infants, invalids, convalescents, &c., and for the prevention of diarrhea, dysentery, and summer-complaint. Said meal consists of certain ingredients, in or about the proportions hereinafter-specified, and which are compounded substantially as follows:

FORMULA.—Clean sugar, twenty pounds; finely-ground rice, eight pounds; corn-starch, eight pounds; cocoa, two and a half pounds; vanilla, one-half ounce; bicarbonate of soda, two ounces; powdered fennel-seed, one-half ounce.

The above-specified ingredients, on being carefully prepared, are intimately mixed and combined together by passing them through a mill or otherwise, forming thereby the above-said compound or nourishing meal—a desirable and nutritious article of food for infants, invalids, convalescents, &c., and a preventive of diarrhea, dysentery, and summer-complaint.

The meal may be prepared for use by making it into a mush or gruel in the same manner as such food is usually prepared.

The proportions of the ingredients may be slightly varied, according to the purity of the materials, without changing the nature of the invention.

What I claim as the invention of the aforesaid HUGO HENSCH, and desire to secure by Letters Patent, is—

The herein-described compound or nourishing meal, consisting of the ingredients specified, substantially in the manner as and for the purposes set forth.

LOUIS G. MEYER,
*Administrator.*

Witnesses:
J. H. BURRIDGE,
A. F. CORNELL.